(12) United States Patent
Yang et al.

(10) Patent No.: US 10,658,644 B2
(45) Date of Patent: May 19, 2020

(54) BATTERY

(71) Applicant: Ningde Amperex Technology Limited, Ningde, Fujian (CN)

(72) Inventors: Hongzhan Yang, Fujian (CN); Jing Jiang, Fujian (CN); Qiao Zeng, Fujian (CN); Kefei Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 16/133,953

(22) Filed: Sep. 18, 2018

(65) Prior Publication Data
US 2019/0319247 A1    Oct. 17, 2019

Related U.S. Application Data

(63) Continuation of application No. PCT/CN2018/082885, filed on Apr. 12, 2018.

(51) Int. Cl.
| | | |
|---|---|---|
| *H01M 2/18* | (2006.01) | |
| *H01M 10/04* | (2006.01) | |
| *H01M 2/02* | (2006.01) | |
| *H01M 2/20* | (2006.01) | |
| *B31D 1/02* | (2006.01) | |

(52) U.S. Cl.
CPC ............. *H01M 2/18* (2013.01); *H01M 2/021* (2013.01); *H01M 2/0275* (2013.01); *H01M 2/0287* (2013.01); *H01M 2/204* (2013.01); *H01M 10/0436* (2013.01); *H01M 10/0459* (2013.01); *B31D 1/021* (2013.01)

(58) Field of Classification Search
CPC ....... H01M 2/021; H01M 2/0275; H01M 2/18
USPC .......................................................... 429/129
See application file for complete search history.

(56) References Cited

U.S. PATENT DOCUMENTS

| | | | | |
|---|---|---|---|---|
| 2013/0344380 | A1* | 12/2013 | Lee ........................ | H01M 2/02 429/186 |
| 2015/0118543 | A1* | 4/2015 | Kim ..................... | H01M 2/021 429/156 |
| 2016/0380302 | A1* | 12/2016 | Yun ................... | H01M 10/0431 429/94 |
| 2017/0309870 | A1* | 10/2017 | Millon ................ | H01M 2/0262 |

* cited by examiner

*Primary Examiner* — James M Erwin

(57) ABSTRACT

Embodiments of the present application disclose a battery to reduce the volume of the battery, improve the energy density of the battery, and further improve the bottom molding effect of the battery, as well as the safety performance and service life of the battery. The battery comprises an electrode assembly and a package film for packaging the electrode assembly, the package film including a folding portion, the folding portion including a first segment attached to the end face of the electrode assembly and a second segment connected to the first segment. The first segment is arranged between the second segment and the electrode assembly, and the second segment includes a multilayer package films.

12 Claims, 5 Drawing Sheets

BATTERY

CROSS-REFERENCE TO RELATED APPLICATIONS

The present application is a continuation-application of PCT Patent Application No. PCT/CN2018/082885 filed on Apr. 12, 2018, the entire contents of which are hereby incorporated by reference.

FIELD OF THE INVENTION

The present application relates to the technical field of battery, in particular, to a battery and a package film thereof.

BACKGROUND OF THE INVENTION

Compared with ordinary steel-shell batteries, pouch cells have the advantages of high energy density, small size, light weight and flexible design, and are therefore favored by many users and widely used in mobile portable electronic products. In order to increase the energy density of the battery, the package bag of the pouch cell is also becoming thinner and lighter. The light and thin development of package bags will inevitably affect the safety of pouch cells, and the safety of pouch cells has always been the most important issue. Therefore, the package bag of the battery must be able to meet the requirements for good insulation, corrosion resistance, water resistance, high strength and good molding of the electrode assembly.

SUMMARY OF THE INVENTION

The purpose of embodiments of the present application is to provide a battery to reduce the volume of the battery, improve the energy density of the battery, and further improve the bottom molding effect of the battery, as well as the safety performance and service life of the battery.

Embodiments of the present application provide a battery. The battery comprises an electrode assembly and a package film packaging the electrode assembly; the package film includes a folding portion, the folding portion including a first segment attached to an end face of the electrode assembly and a second segment connected to the first segment; the first segment is arranged between the second segment and the electrode assembly, and the second segment includes multilayer package films.

In a specific embodiment of the present application, the second segment includes an organic layer located on a surface of the package film; the multilayer package films are bonded by the organic layer.

In a specific embodiment of the present application, the second segment is bonded to the first segment.

In a specific embodiment of the present application, a glue layer is arranged between the second segment and the first segment, and the second segment is bonded to the first segment by the glue layer.

In a specific embodiment of the present application, the battery further comprises a bonding portion arranged outside the first segment and the second segment, and the second segment and the first segment are fixed by the bonding portion.

In a specific embodiment of the present application, the multilayer package films are of a unitary structure.

In a specific embodiment of the present application, the battery further comprises an electrode tab, and the electrode tab and the second segment are arranged on opposite sides of the battery.

In a specific embodiment of the present application, the electrode tab and the second segment are located on the same side of the battery.

In a specific embodiment of the present application, the electrode assembly includes a separator located inside the package films.

In a specific embodiment of the present application, the second segment includes an organic layer, and the organic layer is bonded to the separator.

In a specific embodiment of the present application, a thickness of the second segment satisfies:

$h = 2d + n;$ wherein h is the thickness of the second segment, d is the thickness of the package film, and n is an adjustment factor, $-1 \text{ mm} \le n \le 5 \text{ mm}$.

In a specific embodiment of the present application, a width of the second segment in a first direction satisfies:

$0.2 \text{ mm} \le W \le 10 \text{ mm};$ wherein W is the width of the second segment in the first direction.

In a specific embodiment of the present application, the battery comprises a secondary lithium ion battery.

In embodiments of the present application, the folding portion including a first segment attached to the end face of the electrode assembly and a second segment connected to the first segment. The second segment is located outside the first segment, and the second segment includes two layers of package film. In the present embodiment, by making the second segment in the folding portion, the gap between the package film and the bottom of the electrode assembly may be eliminated, so that the first segment may be bonded to the end face of the electrode assembly, and the battery may be placed close to the side of the bottom of the electrode assembly when the vacuuming process is performed for not easily forming wrinkles and for well forming the bottom of the battery. In addition, the solution eliminates the gap between the bottom of the electrode assembly and the package film in the prior art, reduces the volume of the battery, and increases the energy density of the battery. The shape and structure of the package film of the solution is relatively regular, and the battery is not easily damaged when the vacuuming process is performed, so the safety performance and the service life of the battery may be improved.

BRIEF DESCRIPTION OF THE DRAWINGS

In order to be more clearly illustrating the technical solutions of embodiments of the present disclosure or related arts, the drawings which are required to be used in the description of the embodiments or related arts will be briefly described below. It is obvious that the drawings described below are some embodiments of the present disclosure. It will be apparent to one of ordinary skill in the art that other drawings may be obtained based on the accompanying drawings without inventive effort.

REFERENCE NUMERALS

For prior art:
01-electrode assembly; 02-package film; 03-electrode tab;
For embodiments of the present invention:
1-electrode assembly; 11-electrode; 12-separator; 2-pacakge film; 21-folding portion; 211-first segment; 212-second segment; 22-package portion; 3-glue layer; 4-bonding portion; 5-first direction; 6-second direction; 7-selectrode tab

DETAILED DESCRIPTION OF THE PREFERRED EMBODIMENTS

Figure 1:
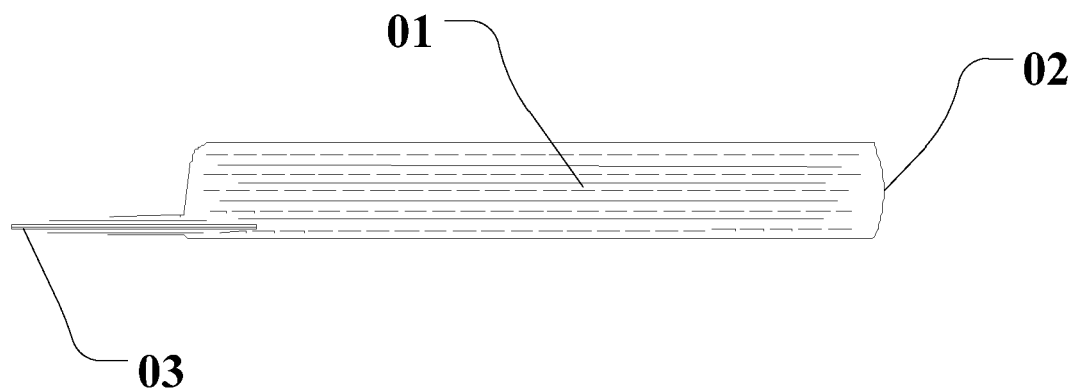
FIG. 1 is a section view showing the structure of a battery according to an embodiment of the prior art.
Figure 2:
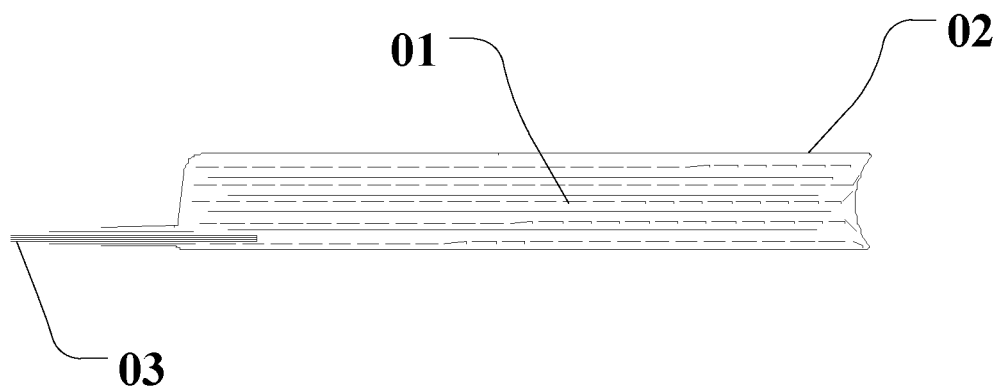
FIG. 2 is a section view showing the structure of a battery according to another embodiment of the prior art.

With reference to FIGS. 1 and 2, in the prior art, a battery comprises an electrode assembly 01, a package film 02 for packaging the electrode assembly 01, and an electrode tab 03 respectively connected to a positive electrode plate and a negative electrode plate of the electrode assembly 01. The manufacturing process of the above battery comprises: punching the package film 02 and loading the battery 01, and packaging the package film 02 to perform liquid injection, formation and vacuuming processes. In the prior art, after the electrode assembly 01 is loaded into the package film 02, a large gap is formed between the bottom of the electrode assembly 01 and the bottom of the package film.

In the subsequent vacuuming process, if the degree of vacuum is small, as shown in FIG. 1, it is easy to leave a large space at the bottom of the electrode assembly 01 and the bottom of the package film 02. Then, on the one hand, the electrode assembly 01 is easily shaken inside the package film 02, and a relative displacement occurs between the electrode assembly 01 and the package film 02, thereby causing damage to the package film 02 and reducing the service life of the battery; on the other hand, the space utilization of the battery is reduced, and the volumetric energy density is reduced. If the degree of vacuum is large, as shown in FIG. 2, the bottom of the package film 02 collapses, and irregular wrinkles appear, resulting in poor appearance of the battery, and even causing the electrode plate to pierce the package film 02, resulting in damage to the package film 02; or the package film 02 squeezes the separator and the electrode plate to make the positive electrode plate directly contact with the negative electrode plate, thereby causing problems such as short-circuit explosion.

In order to make the objects, technical solutions and advantages of the embodiments of the present disclosure clearer, the technical solutions in the embodiments of the present disclosure will be clearly and completely described hereafter in connection with the drawings in the embodiments of the present disclosure. It is apparent that the described embodiments are a part of the embodiments of the present disclosure, but not the whole. Based on the embodiments of the present disclosure, all the other embodiments obtained by those of ordinary skill in the art without inventive effort are within the scope of the present disclosure.

Figure 3:
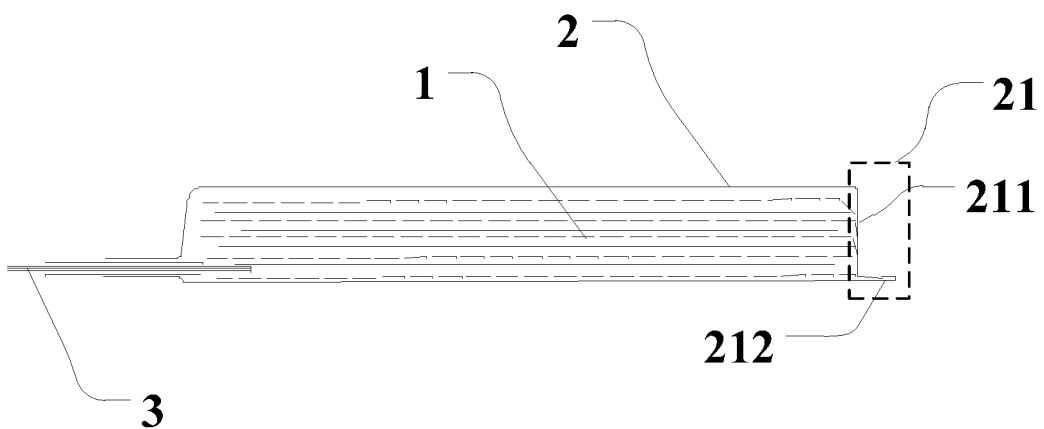
FIG. 3 is a section view showing the structure of a battery according to an embodiment of the present application.
Figure 4:
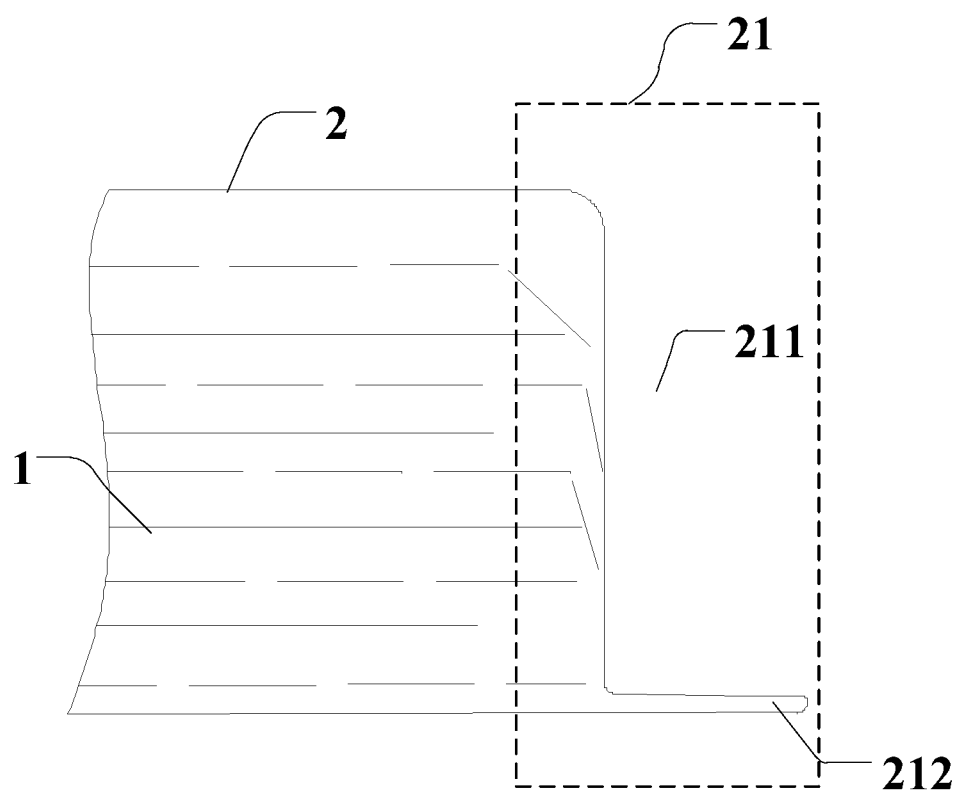
FIG. 4 is a partial enlarged view of the battery shown in the embodiment of FIG. 3.

With reference to FIGS. 3 and 4, embodiments of the present application provide a battery comprising an electrode assembly 1 and a package film 2 for packaging the electrode assembly 1; the package film 2 includes a folding portion 21, and the folding portion 21 includes a first segment 211 attached to the end face of the electrode assembly 1 and a second segment 212 connected to the first segment 211; the first segment 211 is arranged between the second segment 212 and the electrode assembly 1, and the second segment 212 includes two layers of package film 2.

Figure 5:
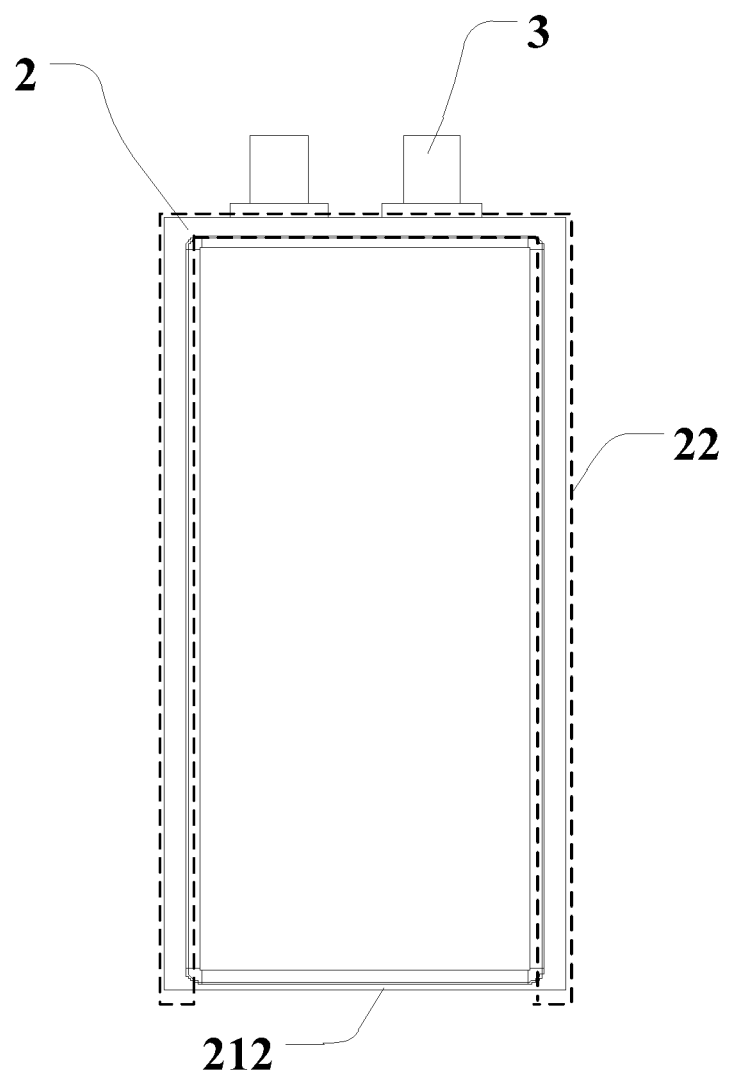
FIG. 5 is a structural schematic view of a battery according to another embodiment of the present application.

As shown in FIGS. 3 to 5, in an embodiment of the present application, the battery comprises an electrode assembly 1 and a package film 2 for packaging the electrode assembly 1. The manufacturing process of the above battery comprises: punching the package film 2 to form the folding portion 21 of the package film 2, loading into the electrode assembly 1, and packaging the packaging film 2 on the side other than the folding portion 21 to form the package portion 22 to perform liquid injection, formation and vacuuming processes.

In embodiments of the present application, the package film 2 is in the form of a plate, which is folded after the punching process, and then the side of the package film 2 other than the folding portion 21 is packaged, and the side of the package is the package portion 22, so that the package bag of the battery may be formed. Specifically, the area where the package film 2 is folded is the folding portion 21, and the folding portion 21 is opposite to the bottom of the electrode assembly 1 of the battery. In specific embodiments shown in FIGS. 3 to 5, the above-mentioned folding portion 21 is located on the side opposite to the electrode tab.

In embodiments of the present application, the folding portion 21 includes a first segment 211 attached to the end face of the electrode assembly 1 and a second segment 212 connected to the first segment 211; the first segment 211 is arranged between the second segment 212 and the electrode assembly 1, and the second segment 212 includes two layers of package film 2. In the present embodiment, by making the second segment 212 in the folding portion 21, the gap between the package film 2 and the bottom of the electrode assembly 1 may be eliminated, so that the first segment 211 may be bonded to the end face of the electrode assembly 1, and the battery may be placed close to the side of the bottom of the electrode assembly 1 when the vacuuming process is performed for not easily forming wrinkles and for well forming the bottom of the battery. In addition, the solution eliminates the gap between the bottom of the electrode assembly 1 and the package film 2 in the prior art, reduces the volume of the battery, and increases the energy density of the battery. The shape and structure of the package film 2 of the solution is relatively regular, and the battery is not easily damaged when the vacuuming process is performed, so the safety performance and the service life of the battery may be improved.

It should be noted that, in a specific embodiment, the above battery is a pouch cell.

In an alternative embodiment, the package films 2 of the second segment 212 may or may not be fixed to each other. For example, the packaging film 2 of the second segment 212 may be fixedly connected by gluing or hot pressing. Alternatively, only the press-bonding process may be performed, and the package film 2 of the second segment 212 is not fixed to each other, and only the package film 2 is folded to form the second segment 212.

In a specific embodiment, the package film 2 of the second segment 212 includes an organic layer located on the surface of the package film 2 and a metal layer; the two layers of package film 2 are bonded by the organic layer.

The second segment 212 may be a second segment 212 that is press-bonded, that is, the second segment 212 is fabricated by a press-bonding process to securely connect the two layers of the packaging film 2. Of course, it is also possible to perform heat sealing after the second segment 212 is subjected to the press-bonding process to improve the structural stability of the second segment 212. Alternatively, other processes may be used to make the second segment 212.

Figure 6:
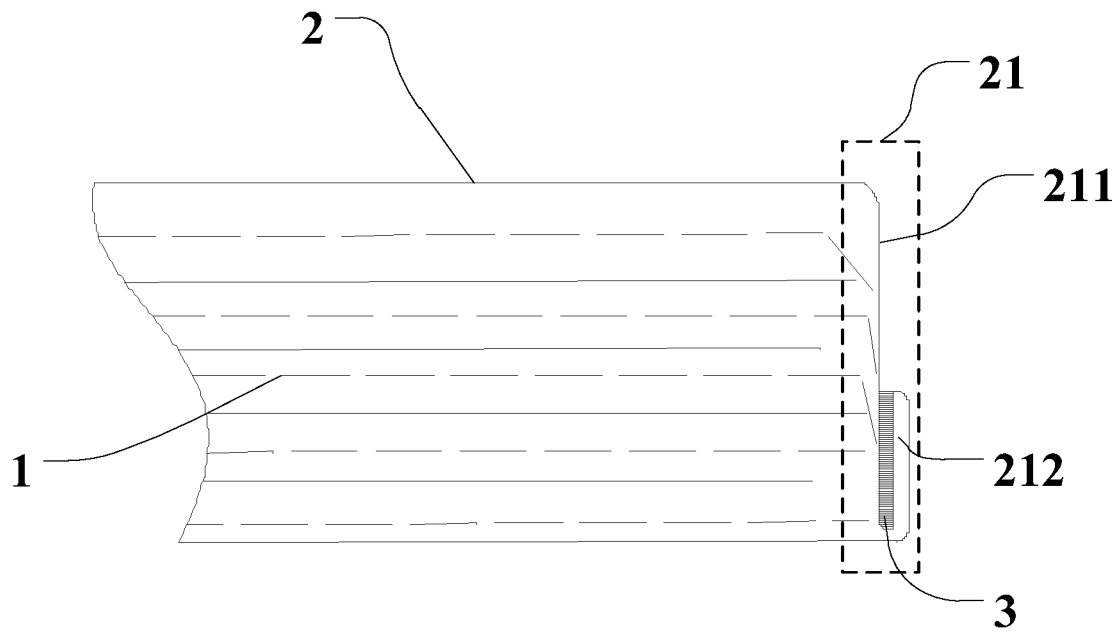
FIG. 6 is a partial section view showing the structure of a battery according to an embodiment of the present application.
Figure 7:
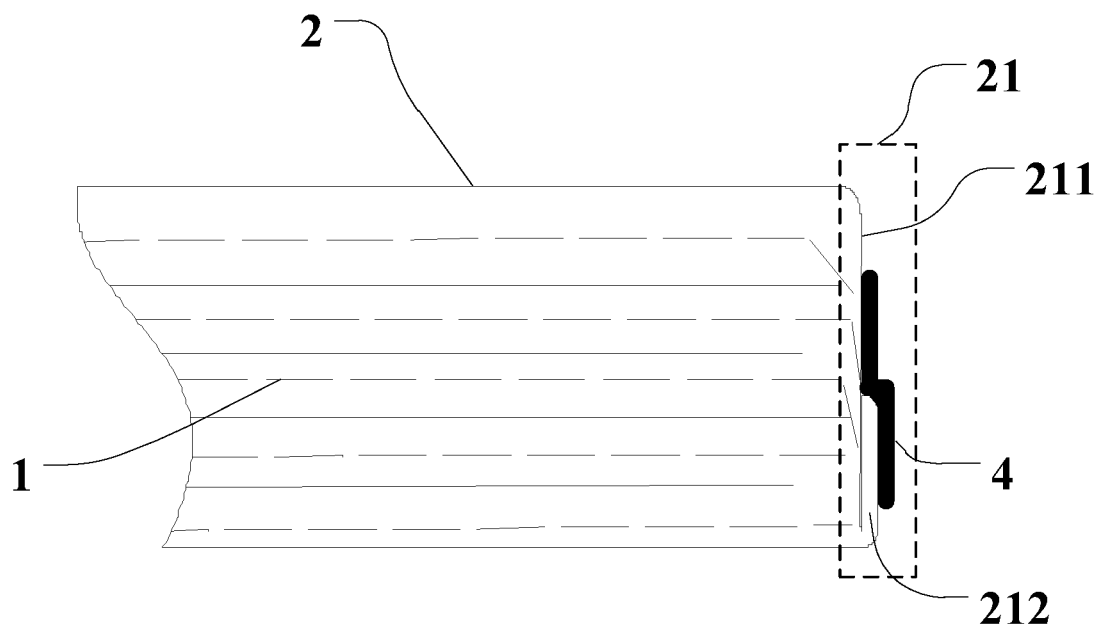
FIG. 7 is a partial section view showing the structure of a battery according to another embodiment of the present application.

As shown in FIGS. 6 and 7, in a preferred embodiment, the second segment 212 is affixed to the first segment 211. In the present embodiment, the second segment 212 may be folded and affixed to the outside of the first segment 211, that is, attached to the bottom of the battery. In the present embodiment, the structure of the battery is more regular, and when the battery is used, the occupied area is small. And in the present embodiment, the second segment 212 is not easily deployed; the stability of the structure of the second segment 212 may be further improved.

The specific manner in which the second segment 212 is affixed outside the first segment 211 is not limited. For example, as shown in FIG. 6, in a specific embodiment, a glue layer 3 is arranged between the second segment 212 and the first segment 211, and the second segment 212 is bonded to the first segment by the glue layer 3. In the present embodiment, the second segment 212 is affixed outside the first segment 211 by providing a glue layer 3 between the second segment 212 and the first segment. As shown in FIG. 7, in another specific embodiment, the battery further comprises a bonding portion 4, the bonding portion 4 is arranged outside the first segment 211 and the second segment 212, so that the second segment 212 is affixed to the first segment 211.

In a specific embodiment, the two layers of package film 2 are of a unitary structure. For example, this may be realized that the second segment 212 is folded by a package film 2 to form the two layers of packaging film 2. As shown in FIG. 6, the package film 2 is a whole piece of film material, and a folding portion is formed in the middle of the film material, and the film material is folded to cover the electrode assembly 1; in the second segment 212 formed by the folding portion, the two layers of package film 2 are unfolded in a connected relationship.

Figure 8:
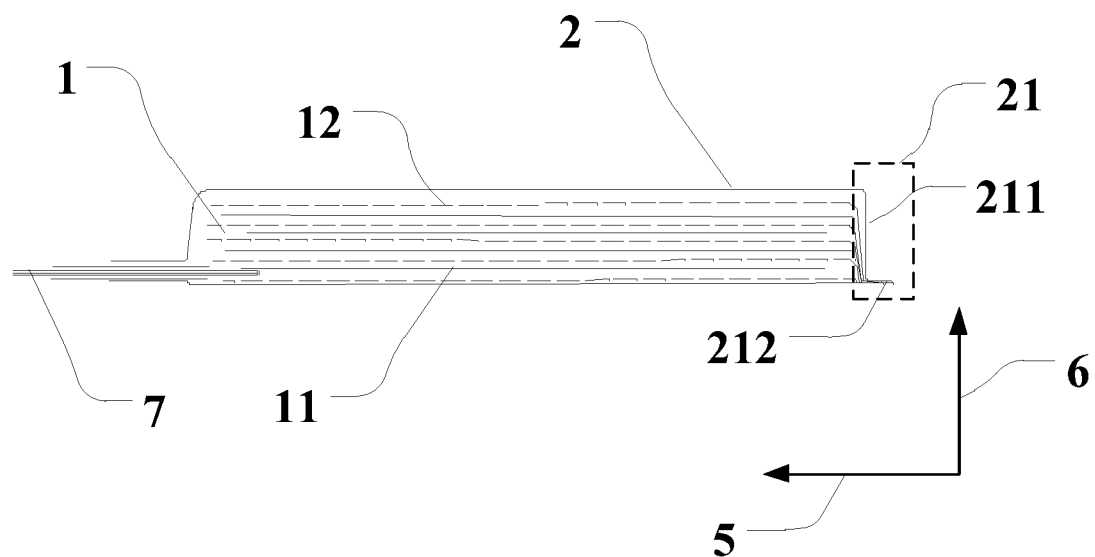
FIG. 8 is a section view showing the structure of a battery according to a still another embodiment of the present application.

With reference to FIG. 8, in a specific embodiment, the battery further comprises an electrode tab 7, and the electrode tab and the second segment 212 are arranged on opposite sides of the battery. In an embodiment shown in FIG. 7, the electrode tab 7 and the second segment 212 are oppositely arranged on opposite sides of a first direction 5 of the battery; specifically, the first direction 5 refers to the direction in which the electrode tab 7 extends from the package film 2. Of course, this embodiment is only used as a specific embodiment. In practical applications, the position of the electrode tab 7 may also be designed according to requirements.

With reference to FIG. 8 again, in a more specific embodiment, the electrode tab 7 and the second segment 212 are located on the same side of the battery. In the present embodiment, the second segment 212 is not affixed to the outside of the first segment 211 but is in a deployed state. In an embodiment shown in FIG. 8, the electrode tab 7 and the second segment 212 are located on the same side of the battery in a second direction 6 of the battery, and the second direction 6 is specifically perpendicular to the first direction 5, and the electrode tab 7 and the second segment 212 are located on the same side of the battery. Then, when the battery is used, the externally extending structure of the electrode assembly 1 is located on the same side, so that it is convenient to install the battery and install other accessories in the battery accessory.

Figure 9:
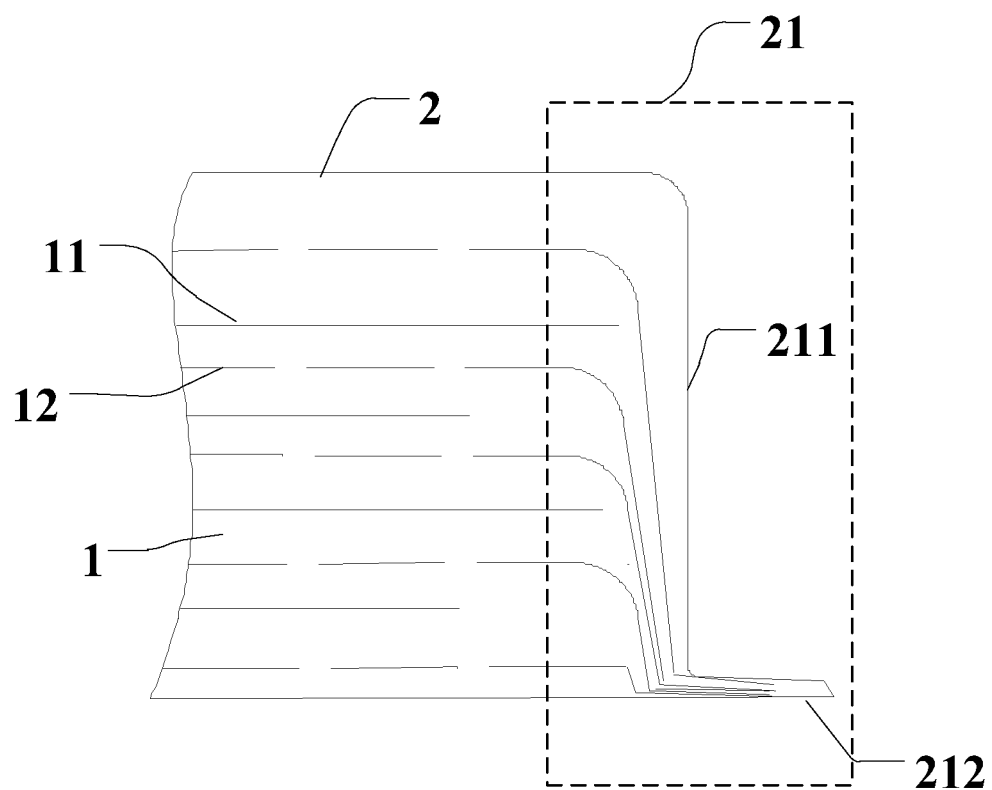
FIG. 9 is a partial enlarged view of the battery shown in the embodiment of FIG. 8.

With continued reference to FIGS. 8 and 9, in a preferred embodiment, the electrode assembly 1 comprises an electrode plate 11, a separator 12 and electrolyte (not shown), wherein a portion of the separator 12 is located between the package films 2 of the second segment 212.

In the present embodiment, the second segment 212 may also fix the separator 12, so that the electrode assembly 1 is relatively firmly fixed in the package film 2, reducing the relative movement between the electrode assembly 1 and the package film 2, further improving the service life of the battery.

In a specific embodiment, the package film of the second segment includes an organic layer, and the organic layer is bonded to the separator. Specifically, the second segment of the embodiment and the separator are fixed by means of hot pressing, and then the fixing strength of the separator and the second segment may be further improved.

In a specific embodiment, the thickness of the second segment satisfies:

$$h=2d+n,$$

wherein h is the thickness of the second segment, d is the thickness of the package film, and n is an adjustment factor, $-1$ mm$\leq n\leq 5$ mm.

It should be noted that in a specific embodiment, n may be a negative value, because the method for fabricating the second segment is not specifically limited. When fabricated by hot pressing, the thickness of the second segment may be less than the thickness of the two layers of package film.

The width of the second segment in a first direction satisfies:

$$0.2 \text{ mm} \leq W \leq 10 \text{ mm},$$

wherein W is the width of the second segment along the first direction. As shown in FIGS. 8 and 9, the starting point of the width measurement is the intersection of the first segment and the second segment, and the ending point of the width measurement is the most distal end of the second segment that is away from of the electrode assembly in the first direction.

If the size of the second segment satisfies the above conditions, the first segment may be attached to the end face of the electrode assembly, thus the gap between the bottom of the electrode assembly and the package film in the prior art may be eliminated to reduce the volume of the battery for increasing the energy density of the battery. And the bottom molding effect of the battery, as well as the safety performance and service life of the battery may further be improved. Specifically, as shown in FIG. 7, in the present embodiment, the first direction 5 also refers to the length direction of the battery.

In a specific embodiment, the package film includes a stacked multilayer structure including a metal layer and a non-metal layer, and the metal layer is arranged between the non-metal layers.

In the present embodiment, the metal layer has a certain hardness, may maintain the shape of the package film, is favorable for battery molding, and may improve the strength of the package film, so that the battery is not easy to leak; the non-metal layer adjacent to the electrode assembly may isolate the decomposition liquid of the electrode assembly; the non-metallic layer exposed on the outside is directly in contact with the environment, so wear resistance is required to improve the battery service life.

In a specific embodiment, the package film includes a stacked three-layer structure including two layers of non-metal layer and a layer of metal layer arranged between the two layers of non-metal layer. In the present embodiment, the structure of the package film is relatively simple and may satisfy the functional requirements of the battery.

In a specific embodiment, the metal layer is an aluminum layer, the non-metal layer adjacent to the electrode assembly is a polypropylene layer, and the non-metal layer exposed on the outside is a nylon layer.

In a specific embodiment, the material with the highest mass content in the metal layer is iron or the material with the highest mass content in the metal layer is iron. That is, it may be an aluminum foil or an iron foil which is often said to be easy to obtain at a low cost, and the strength thereof may satisfy the strength requirement of the battery for the package film.

The above package film material is only a specific embodiment, and the material of any one layer may be replaced with other materials as needed.

In a specific embodiment, the specific type of battery is not limited, and the battery includes a secondary lithium ion battery.

It will be apparent to those skilled in the art that various modifications and variations of the present application may be made without departing from the spirit or scope of the application. If these various modifications and variations of the present application belong to the scope of the claim and equivalent technical scope, the present application is intended to comprise these modifications and variations.

What is claimed is:

1. A battery comprising:
   an electrode assembly;
   a package film packaging the electrode assembly;
   wherein the package film comprises a folding portion, the folding portion comprises a first segment attached to an end face of the electrode assembly and a second segment connected to the first segment;
   the first segment is arranged between the second segment and the electrode assembly, and the second segment comprises a plurality of multilayer package films, wherein the electrode assembly comprises a separator, and at least a portion of the separator is located between the plurality of multilayer package films of the second segment.

2. The battery according to claim 1, wherein the second segment comprises an organic layer that forms a surface of the package film, and the plurality of multilayer package films are bonded by the organic layer.

3. The battery according to claim 1, wherein the second segment is bonded to the first segment.

4. The battery according to claim 3, wherein a glue layer is arranged between the second segment and the first segment, and the second segment is bonded to the first segment by the glue layer.

5. The battery according to claim 3, wherein the battery further comprises a bonding portion arranged outside the first segment and the second segment, and the second segment and the first segment are fixed by the bonding portion.

6. The battery according to claim 1, wherein the plurality of multilayer package films are of a unitary structure.

7. The battery according to claim 1, wherein the battery further comprises an electrode tab, and the electrode tab and the second segment are arranged on opposite sides of the battery in a first direction.

8. The battery according to claim 1, wherein the battery further comprises an electrode tab, the electrode tab and the second segment are located on the same side of the battery in a second direction.

9. The battery according to claim 1, wherein the electrode assembly comprises a separator located inside the plurality of multilayer package films.

10. The battery according to claim 9, wherein the second segment comprises an organic layer located on a surface of the second segment, and the organic layer is bonded to the separator.

11. The battery according to claim 1, wherein a thickness of the second segment satisfies:

$$h=2d+n;$$

wherein h is the thickness of the second segment, d is the thickness of the package film, and n is an adjustment factor, $-1\ mm \leq n \leq 5\ mm$.

12. The battery according to claim 1, wherein a width of the second segment in a first direction satisfies:

$$0.2\ mm \leq W \leq 10\ mm;$$

wherein W is the width of the second segment in the first direction.

* * * * *